United States Patent
Steinlage et al.

(10) Patent No.: US 9,657,992 B2
(45) Date of Patent: *May 23, 2017

(54) SYSTEM FOR MAINTAINING INTERIOR VOLUME INTEGRITY IN AN INDUCTION VACUUM FURNACE AND METHOD OF MAKING SAME

(71) Applicants: GENERAL ELECTRIC COMPANY, Schenectady, NY (US); GH INDUCTION ATMOSPHERES LLC, Rochester, NY (US)

(72) Inventors: Gregory Alan Steinlage, Hartland, WI (US); Michael Louis Szugye, Macedonia, OH (US); Ben David Poquette, Wauwatosa, WI (US); Mark Andrew Vansumeren, Milwaukee, WI (US); Dale R. Wilcox, Penfield, NY (US); Peter M. Costantino, Batavia, NY (US); Timothy C. Turnia, Rochester, NY (US); Giovanni A. Dallicardillo, Rochester, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/422,524

(22) PCT Filed: May 3, 2013

(86) PCT No.: PCT/US2013/039479
§ 371 (c)(1),
(2) Date: Feb. 19, 2015

(87) PCT Pub. No.: WO2014/035491
PCT Pub. Date: Mar. 6, 2014

(65) Prior Publication Data
US 2015/0247671 A1   Sep. 3, 2015

Related U.S. Application Data

(60) Provisional application No. 61/694,869, filed on Aug. 30, 2012.

(51) Int. Cl.
*H05B 6/10* (2006.01)
*H05B 6/16* (2006.01)
(Continued)

(52) U.S. Cl.
CPC .............. *F27B 14/04* (2013.01); *B23P 19/00* (2013.01); *F27B 5/04* (2013.01); *F27B 5/14* (2013.01);
(Continued)

(58) Field of Classification Search
CPC ... H05B 6/26; H05B 6/105; F27B 5/04; F27B 5/14; F27B 14/04; F27B 14/08;
(Continued)

(56) References Cited

U.S. PATENT DOCUMENTS 2,743,306 A   4/1956   Mark, Jr.
3,614,284 A   10/1971  Scheidig et al.
(Continued)

OTHER PUBLICATIONS

International Search Report and Written Opinion issued in connection with corresponding PCT Application No. PCT/US2013/039479 dated Aug. 30, 2013.
(Continued)

*Primary Examiner* — Hung D Nguyen
(74) *Attorney, Agent, or Firm* — GE Global Patent Operation; Marc A. Vivenzio (57) ABSTRACT

An induction furnace for heating a workpiece includes a chamber and an insulation cylinder positioned therein, with the insulation cylinder including a base cover movable between first and second positions, and the first position positioning the workpiece within a heating zone and the
(Continued)

second position positioning the workpiece within a cooling zone. A translation system in the furnace includes a first member coupled to the base cover of the insulation cylinder and extending through a wall of the chamber, an actuator coupled to the first member, the actuator configured to translate the first member to move the base cover of the insulation cylinder between the first and second positions, and an expansion member encircling a portion of the first member and configured to hermetically seal an interior volume of the chamber from an environment volume external to the chamber.

18 Claims, 7 Drawing Sheets

(51) Int. Cl.
| | | |
|---|---|---|
| F27B 14/04 | (2006.01) | |
| F27D 7/06 | (2006.01) | |
| F27B 5/04 | (2006.01) | |
| F27B 5/14 | (2006.01) | |
| F27B 14/06 | (2006.01) | |
| F27D 9/00 | (2006.01) | |
| F27D 11/06 | (2006.01) | |
| H01F 5/02 | (2006.01) | |
| B23P 19/00 | (2006.01) | |
| H05B 6/26 | (2006.01) | |
| F27B 14/08 | (2006.01) | |
| F27D 21/00 | (2006.01) | |
| F27B 5/06 | (2006.01) | |

(52) U.S. Cl.
CPC ............ *F27B 14/061* (2013.01); *F27B 14/08* (2013.01); *F27D 7/06* (2013.01); *F27D 9/00* (2013.01); *F27D 11/06* (2013.01); *H01F 5/02* (2013.01); *H05B 6/105* (2013.01); *H05B 6/26* (2013.01); *F27B 2005/062* (2013.01); *F27B 2014/045* (2013.01); *F27B 2014/066* (2013.01); *F27B 2014/0831* (2013.01); *F27B 2014/0837* (2013.01); *F27B 2014/0887* (2013.01); *F27D 2009/0075* (2013.01); *F27D 2021/0078* (2013.01); *Y10T 29/4902* (2015.01); *Y10T 29/49826* (2015.01)

(58) Field of Classification Search
CPC .............. F27B 14/061; F27B 2014/045; F27B 2014/0831; F27B 2014/0837; F27B 2014/0887; F27B 2014/066; F27B 2005/062; F27D 7/06; F27D 9/00; F27D 11/06; F27D 2009/0075; F27D 2021/0078; Y10T 29/4902; Y10T 29/49826; H01F 5/02; B23P 19/00
USPC ....... 219/632, 634, 635, 646, 647, 638, 636, 219/656, 658; 373/8, 138, 140, 141, 151, 373/155–158, 165; 164/122.1, 127, 361, 164/338.1; 118/733, 728, 69, 726, 715, 118/725; 266/155, 250, 87, 192
See application file for complete search history.

(56) References Cited

U.S. PATENT DOCUMENTS

| | | | |
|---|---|---|---|
| 3,972,704 | A | 8/1976 | Loxley et al. |
| 4,062,319 | A | 12/1977 | Roth et al. |
| 4,604,510 | A | 8/1986 | Laughlin et al. |
| 5,178,316 | A | 1/1993 | Block |
| 5,219,051 | A | 6/1993 | Davis |
| 5,257,927 | A | 11/1993 | Lang |
| 5,611,476 | A | 3/1997 | Soderlund et al. |
| 5,713,979 | A | 2/1998 | Nicholson et al. |
| 6,062,851 | A | 5/2000 | Rudolph et al. |
| 6,649,887 | B2 | 11/2003 | Budinger |
| 6,861,629 | B2 | 3/2005 | Dahake et al. |
| 7,048,799 | B2 | 5/2006 | Petroz |
| 8,242,420 | B2 | 8/2012 | Fishman |
| 2005/0013339 | A1 | 1/2005 | Miller et al. |
| 2006/0032586 | A1 | 2/2006 | Choi et al. |
| 2006/0185580 | A1 | 8/2006 | Tohta et al. |
| 2007/0110985 | A1 | 5/2007 | Miller et al. |
| 2007/0128569 | A1 | 6/2007 | Tenzek et al. |
| 2008/0264206 | A1 | 10/2008 | Rocha et al. |
| 2008/0308551 | A1 | 12/2008 | Wilcox et al. |
| 2009/0184109 | A1 | 7/2009 | Sawada et al. |
| 2009/0274848 | A1* | 11/2009 | Strock ................ C23C 4/00 118/69 |
| 2009/0323756 | A1 | 12/2009 | Tenzek |
| 2009/0325386 | A1* | 12/2009 | Devine ............... C23C 16/4412 118/715 |
| 2010/0111648 | A1 | 5/2010 | Tamura et al. |
| 2010/0226630 | A1* | 9/2010 | Shibagaki ........... F27B 17/0025 219/411 |
| 2010/0243644 | A1 | 9/2010 | Terashima et al. |
| 2010/0252550 | A1 | 10/2010 | Dunn |
| 2011/0111209 | A1 | 5/2011 | Weiss |
| 2011/0176576 | A1 | 7/2011 | Naitoh et al. |
| 2011/0192254 | A1 | 8/2011 | Egeland et al. |
| 2012/0085752 | A1 | 4/2012 | Rinaldi et al. |
| 2012/0133089 | A1* | 5/2012 | Kobayashi ............... C21D 1/40 266/155 |

OTHER PUBLICATIONS

A PCT Search Report and Written Opinion issued in connection with related PCT Application No. PCT/US2013/031871 on May 31, 2013.
A PCT Search Report and Written Opinion issued in connection with related PCT Application No. PCT/US2013/038796 on Aug. 26, 2013.
A PCT Search Report and Written Opinion issued in connection with related PCT Application No. PCT/US2013/039737 on Sep. 6, 2013.
A US Non-Final Office Action issued in connection with related U.S. Appl. No. 14/424,038 on Dec. 17, 2015.
A US Non-Final Office Action issued in connection with related U.S. Appl. No. 14/422,289 on Dec. 30, 2015.
A US Final Office Action issued in connection with related U.S. Appl. No. 14/424,038 on Apr. 6, 2016.
A US Final Office Action issued in connection with related U.S. Appl. No. 14/422,289 on Apr. 29, 2016.

* cited by examiner

SYSTEM FOR MAINTAINING INTERIOR VOLUME INTEGRITY IN AN INDUCTION VACUUM FURNACE AND METHOD OF MAKING SAME

CROSS-REFERENCE TO RELATED APPLICATION

This is a national stage application under 35 U.S.C. §371(c) of prior-filed, PCT application serial number PCT/US2013/039479, filed on May 3, 2013, which claims priority to U.S. Provisional Application No. 61/694,869, filed Aug. 30, 2012, the contents of which are incorporated herein by reference.

BACKGROUND OF THE INVENTION

Embodiments of the invention relate generally to induction furnaces for heating a workpiece in an inert atmosphere or vacuum and, more particularly, to a system for providing cooling to a workpiece in a uniform fashion, so as to reduce thermal stress in the workpiece.

Conventional induction furnaces include an induction heating system and a chamber that contains a susceptor that is susceptible to induction heating, with the chamber enclosing an inert atmosphere or vacuum therein. An electromagnetic coil sits outside the susceptor and receives high frequency alternating current from a power supply. The resulting alternating electromagnetic field heats the susceptor rapidly. The workpiece to be heated is placed in proximity to and generally within the susceptor so that when the susceptor is inductively heated by the induction heating system, the heat is transferred to the workpiece through radiation and/or conduction and convection. After a desired heating and processing of the workpiece is completed, the workpiece is then subsequently cooled in order to complete the heating/cooling cycle.

With respect to the overall time required to perform the heating/cooling cycle, it is recognized that the cooling time is a very key factor in the overall cycle time. Thus, it is desirable to be able to reduce the cooling time that is necessary for cooling the workpiece to a desired temperature. As a means for decreasing the cooling time, some prior art systems introduce an inert cooling gas that helps to increase the rate of cooling of the workpiece. While the inert cooling gas may be effective at increasing cooling rates compared to static vacuum cooling, the use of such cooling gas may undesirably lead to a build-up of thermal stress in the workpiece. That is, as typical vacuum furnaces have only a single port for gas entry, the side of the workpiece placed next to the location the gas enters the hot zone will cool very quickly compared to the side that is shielded from the gas. This thermal mismatch that is created in the workpiece is a source of the thermal stress, with the thermal stress being greatly increased as the temperature difference across the workpiece grows. This stress in the workpiece can lead to premature failure or changes in geometry due to warpage.

It would therefore be desirable to have an induction furnace that provides for a decrease in the cooling time of the workpiece, while providing uniform gas cooling of the workpiece so as to improve workpiece temperature uniformity during the cooling process and thereby decrease thermal stress in the workpiece.

BRIEF DESCRIPTION OF THE INVENTION

Embodiments of the invention overcome the aforementioned drawbacks by providing an induction furnace that provides for a decrease in the cooling time of the workpiece, while providing uniform gas cooling of the workpiece so as to improve workpiece temperature uniformity during the cooling process and thereby decrease thermal stress in the workpiece.

In accordance with one aspect of the invention, an induction furnace for heating a workpiece includes a chamber and an insulation cylinder positioned within the chamber, the insulation cylinder including a base cover that is selectively movable between a first position and a second position, wherein the first position is configured to position the workpiece within a heating zone of the induction furnace and wherein the second position is configured to position the workpiece within a cooling zone of the induction furnace. The induction furnace also includes a translation system having a first member coupled to the base cover of the insulation cylinder and extending through a wall of the chamber, an actuator coupled to the first member, the actuator configured to translate the first member to move the base cover of the insulation cylinder between the first and second positions, and an expansion member encircling a portion of the first member and configured to hermetically seal an interior volume of the chamber from an environment volume external to the chamber.

In accordance with another aspect of the invention, an induction furnace for cooling a workpiece includes a chamber having a susceptor positioned therein, wherein an interior volume of the susceptor defines a heating zone located within the chamber configured to be inductively heated by an induction coil when a current is provided to the induction coil and wherein the chamber has a cooling zone positioned therein outside of the interior volume of the susceptor. The induction furnace also includes a support system coupled to a base of the susceptor and that extends through the wall of the chamber, an actuator coupled to the support system and configured to selectively translate the support system to move the base of the susceptor to translate a workpiece tray supported by the base of the susceptor between the heating zone and the cooling zone, and an expansion system configured to surround a portion of the support system to hermetically seal the heating and cooling zones from an environment volume external to the chamber.

In accordance with yet another aspect of the invention, a method of making an induction furnace includes coupling an insulation cylinder within a chamber, the insulation cylinder including a base cover that is selectively movable between a first position and a second position, wherein the second position is configured to seal an interior volume of the insulation cylinder. The method also includes coupling an induction coil to surround at least a portion of the insulation cylinder, coupling a susceptor within the insulation cylinder, coupling a first member to the base cover of the insulation cylinder; the first member extending through a wall of the chamber, coupling a bellows system to surround a portion of the first member that includes an interior volume fluidly coupled to an interior volume of the chamber, coupling a actuator to the first member and to the bellows system, and configuring the actuator to selectively translate the first member to move the base cover of the insulation cylinder between the first and second positions.

These and other advantages and features will be more readily understood from the following detailed description of embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Figure 1:
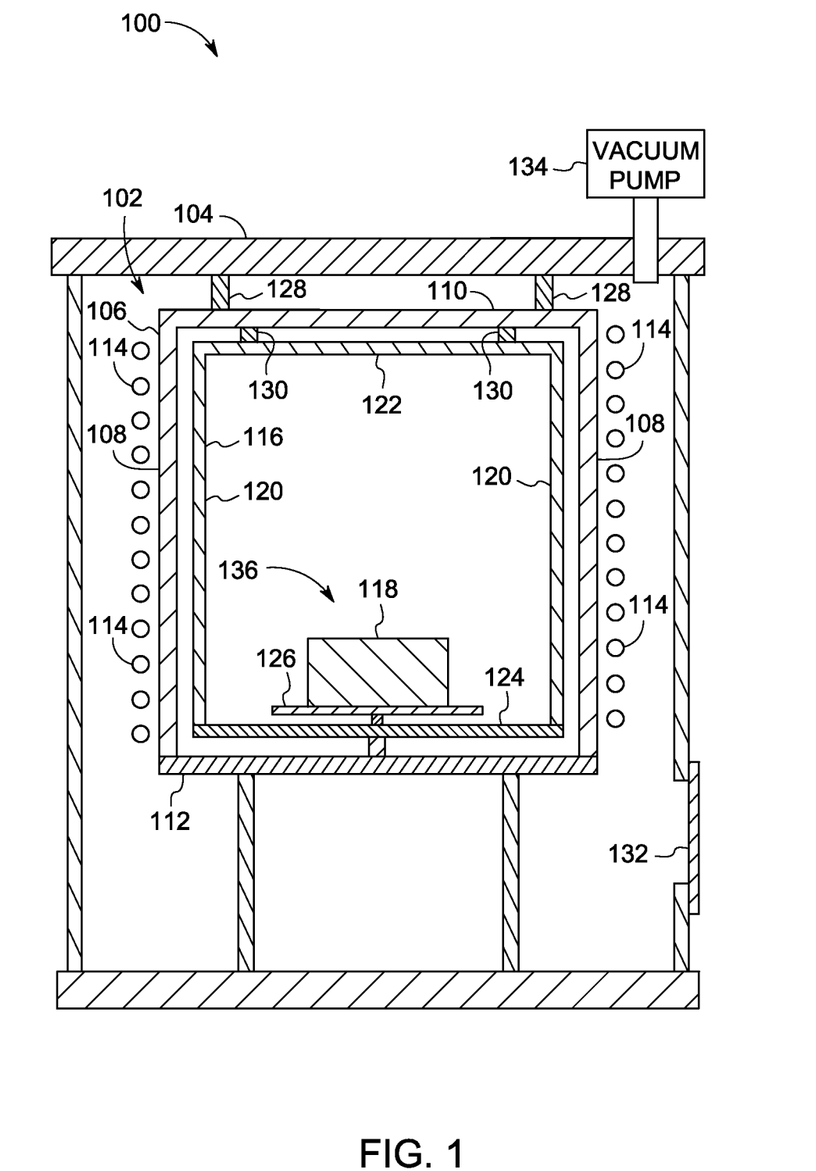
FIG. 1 is a block schematic diagram of an induction furnace according to an embodiment of the invention.
Figure 2:
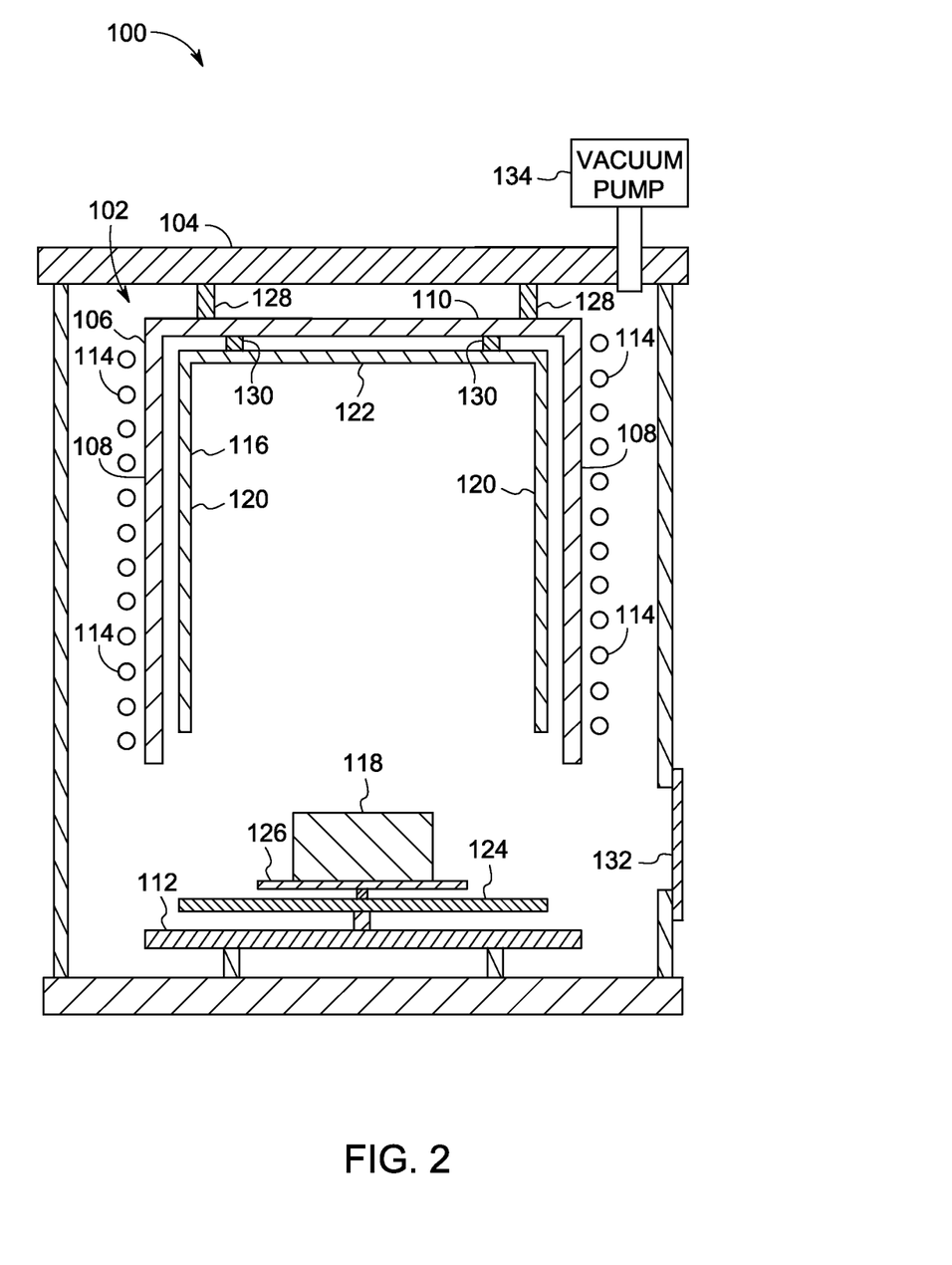
FIG. 2 is an additional diagram of the induction furnace of FIG. 1 where a workpiece is in a lowered position.

Referring to FIGS. 1 and 2, the major components of an induction furnace 100 are shown. Induction furnace 100 includes an induction heating system 102 inside a chamber 104. Induction heating system 102 includes an insulation cylinder 106 having a side wall 108, a top or first cover 110 for sealing one end of cylinder 106, and a base or second cover 112 for sealing the second end of cylinder 106. Induction heating system 102 includes a coil 114 and a power supply (not shown) that provides an alternating current that flows through coil 114 during a heating cycle. Coil 114 is wound to form a helical shape within chamber 104 about insulation cylinder 106 as shown in FIG. 1.

Contained within insulation cylinder 106 is a susceptor 116 that is susceptible to induction heating. That is, when an alternating current flows through coil 114, an alternating magnetic field is generated that induces eddy currents and other effects in susceptor 116 that cause the susceptor 116 to heat. The thermal energy that radiates from susceptor 116 is used to heat a workpiece 118. Susceptor 116 is shown as being cylindrical, but other shapes can be used. Susceptor 116 is made of any material susceptible to induction heating, such as, for example, graphite, molybdenum, steel, and tungsten. Susceptor 116 is arranged within insulation cylinder 106 in chamber 104. Insulation cylinder 106 is made from an insulative material that is not susceptible to induction heating such as, for example, fused quartz.

Susceptor 116 includes a side wall 120, a first cover 122 for sealing one end, and a second cover 124 for sealing the other end. A tray 126 for supporting workpiece 118 to be heated is connected to second cover 124 of susceptor 116. Although susceptor 116 is shown as having closed ends, this need not be the case. For example, the susceptor 116 can be in the form of a tube that is open at both ends or, for example, it can comprise one or more susceptor sheets. First cover 110 of cylinder 106 is coupled to chamber 104 via one or more posts 128 which, in an embodiment, is constructed of a ceramic material. First cover 122 of susceptor 116 is coupled to first cover 110 via one or more additional posts 130.

FIG. 1 illustrates induction heating system 102 in a raised or heating position where workpiece 118 is positioned within susceptor 116 and is ready for heating according to induction furnace principles as described above. As shown in FIG. 2, induction heating system 102 is in a lowered position where access to workpiece 118 through a door 132 of chamber 104 is possible. Induction furnace 100 also includes a vacuum pump 134 for creating a vacuum within the chamber 104. Door 132 forms a hermetic seal when closed such that a vacuum created by vacuum pump 134 in an interior volume of chamber 104 is hermetically isolated from an ambient environment outside chamber 104.

In operation of induction furnace 102, the workpiece 118 is in a raised or heating position, i.e., within in a "heating zone" 136 defined by susceptor 116, when a heating operation is being undertaken. The workpiece 118 is then moved to the lowered or cooling position, i.e., within in a "cooling zone" 138 outside of the susceptor 116, when a cooling operation is being undertaken. Moving workpiece 118 to the cooling zone 138 after completion of the heating of workpiece 118 allows for a reduction in the primary overall furnace cycle time. That is, the time required for cooling workpiece 118 is an important factor in the overall furnace cycle time, as traditional cooling becomes increasingly inefficient at lower temperatures. According to embodiments the invention, faster cooling times are achieved at lower temperatures by dropping the parts out of the hot zone 136 and into the cool zone 138 of the vacuum chamber 104.

Figure 3:
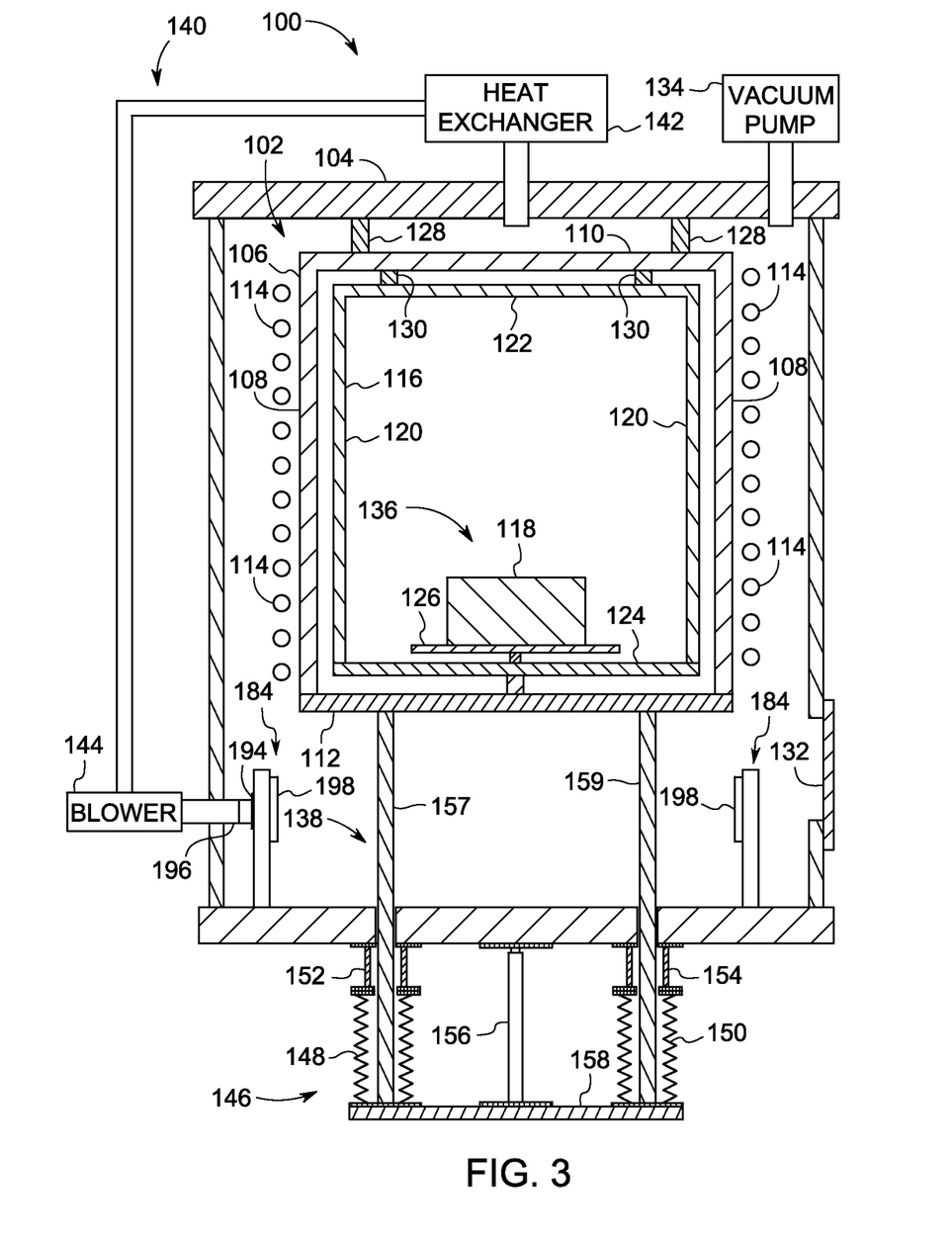
FIG. 3 is a block schematic diagram of an induction furnace according to another embodiment of the invention.
Figure 4:
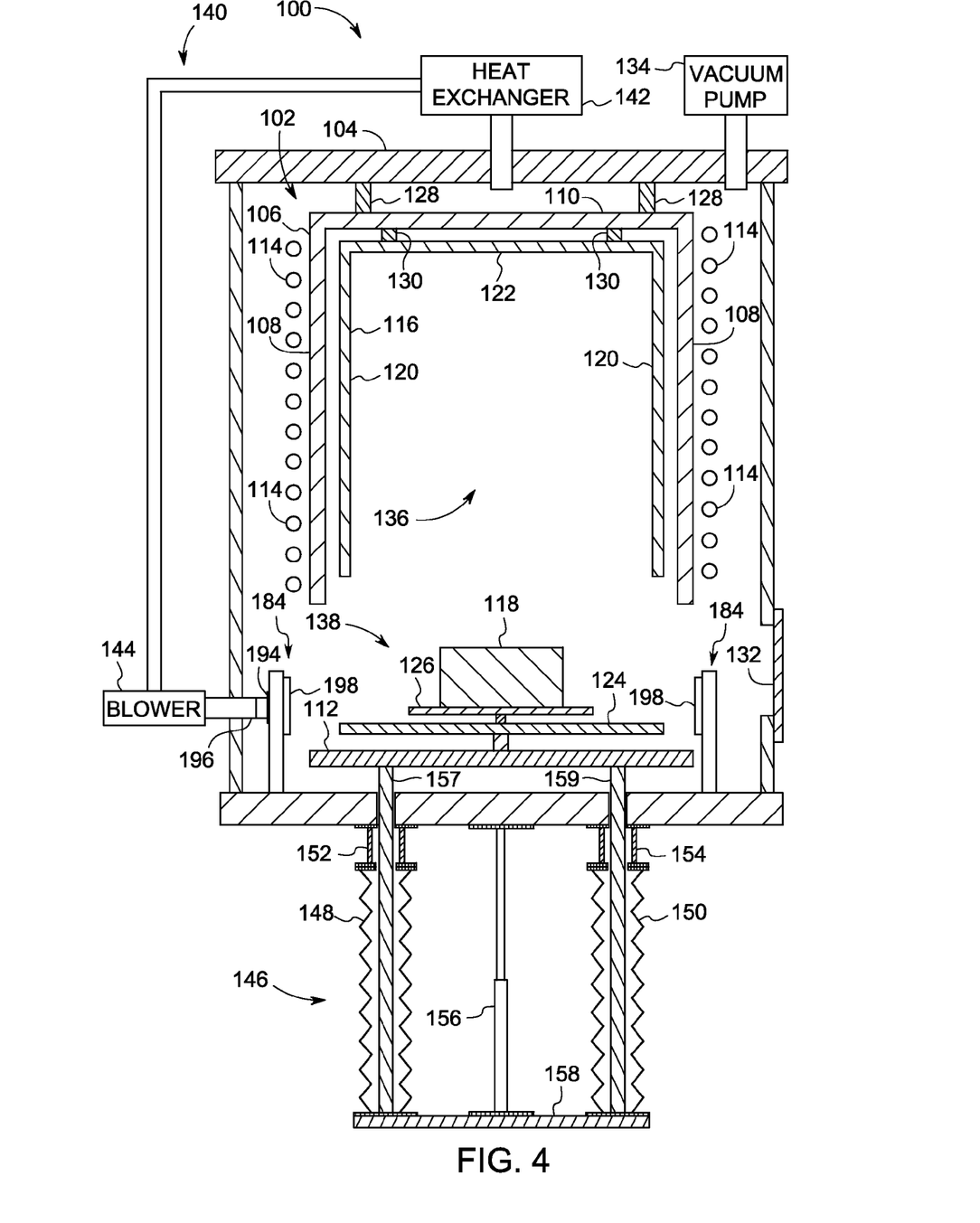
FIG. 4 is an additional diagram of the induction furnace of FIG. 3 where a workpiece is in a lowered position.

According to an exemplary embodiment of the invention, induction furnace 102 is constructed so as to facilitate movement of the workpiece 118 between the heating zone 136 and the cooling zone 138 while maintaining a desired vacuum pressure within chamber 104, and is further constructed to include elements to enhance cooling of the workpiece 118. Referring now to FIGS. 3 and 4, induction furnace 102 is shown as including a cooling system 140 for cooling chamber 104 after the workpiece 118 has been heated as desired. Cooling system 140 can include a heat exchanger 142 and a blower 144. Hot air within the chamber 104 is drawn into the heat exchanger 142, and cooler air is blown back into chamber 104 by blower 144.

After completion of a heating of workpiece 118, the second cover 124 and tray 126 are dropped using a sealed translation system 146 attached to second cover 112. According to one embodiment, translation system 146 includes a pair of vacuum-sealed bellows 148, 150 attached to respective coupling devices 152, 154 that are coupled to chamber 104. A pair of cover members or supports 157, 159 are coupled to second cover 112 and pass through coupling devices 152, 154 to couple to bellows 148, 150 as illustrated. In this manner, bellows 148, 150 and coupling devices 152, 154 surround or encircle coupling devices 152, 154. According to another embodiment, cover supports 157, 159 may be directly coupled to a plate 158, which is also coupled to bellows 148, 150. A linear actuator 156 such as a piston is coupled to chamber 104 external to its interior volume and is coupled to bellows 148, 150 via plate 158. Embodiments of the invention contemplate that linear actuator 156 may be a pneumatic or hydraulic piston, an electro-mechanical piston, a manual actuator, or the like. The interior volumes of bellows 148, 150 and coupling devices 152, 154 are fluidly coupled to the interior volume of chamber 104. In this manner, movement of linear actuator 156 from the outside of chamber 104 allows the atmosphere and pressure inside chamber 104 to be maintained when plate 158 is moved either away from or toward chamber 104. That is, while plate 158 is being moved away from or toward chamber 104, bellows 148, 150 elongate or shorten accordingly to maintain a separation of the inside of chamber 104 from the volume or the outside environment. Thus, workpiece 118 can be lowered from heating zone 136 to cooling zone 138 while being hermetically sealed from the outside of chamber 104. In addition, the pressure within chamber 104 may be separated from the outside environment when lowering workpiece 118 from heating zone 136 to cooling zone 138.

According to various embodiments, the movement to the cooling position or zone may be governed by a threshold time and/or temperature, and may be triggered by pressure or RGA or partial pressure, or rates of any of these. In one embodiment, the part or workpiece 118 is dropped into the cool section 138 after the part has cooled to an appropriate temperature as dictated by either equipment or process constraints. This effectively opens the insulated hot zone 136 and allows the cooling gas to pass across the heated parts 118. Once the workpiece 118 drops out of the hot zone 136, the workpiece 118 experiences improved radiative and convective cooling, and possibly conductive cooling depending on system design. The area of the cooling zone 138 within chamber 104 has unique temperature control (i.e., ability to quench from high temperature to a lower, controlled temperature), which is particularly useful for thermal processing, such as heat treating. Due to the multi-zone configuration of the vacuum chamber, cooling times may be greatly reduced when compared with cooling inside heating zone 136, and faster cycle times can be met.

Figure 5:
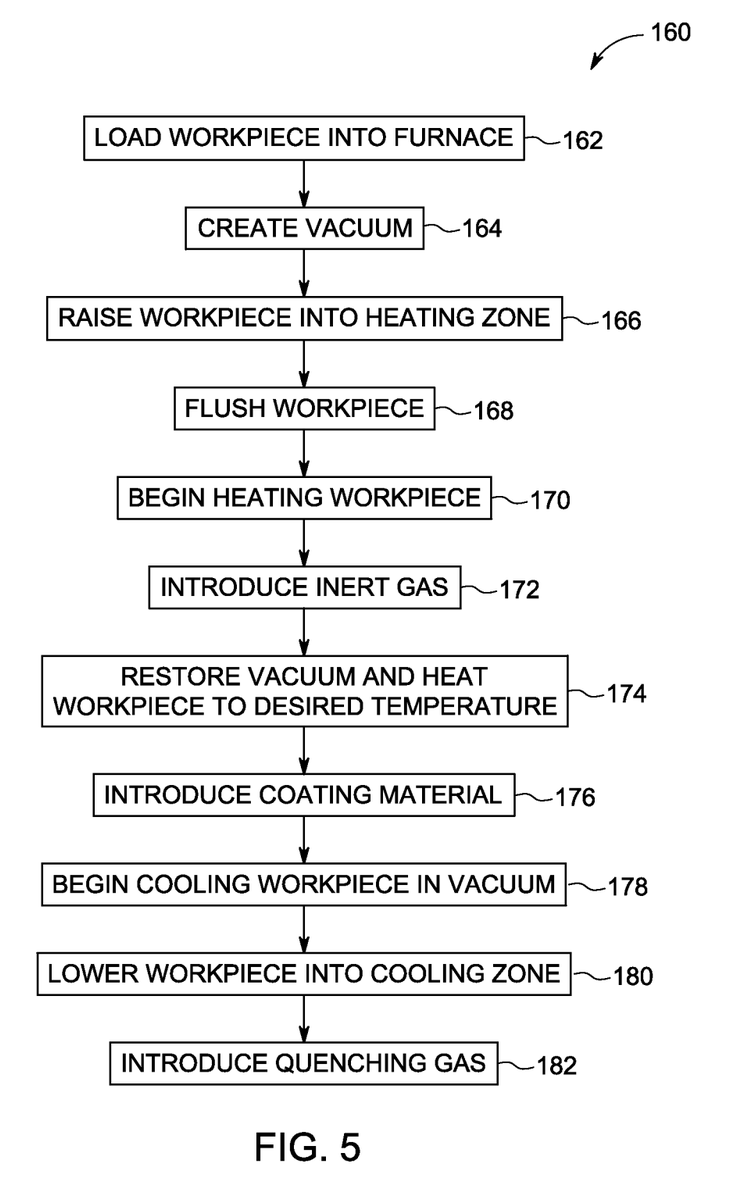
FIG. 5 is a flowchart illustrating a technique for heating and cooling a workpiece using an induction furnace according to an embodiment of the invention.

Referring now to FIG. 5, and with continued reference to the furnace of FIGS. 3 and 4, a technique 160 for heating and cooling a workpiece is illustrated according to an embodiment of the invention. The technique begins at STEP 162 with loading of a workpiece 118 into the furnace 100, such as by way of door 132, with the piece being positioned on tray 126 when it is in a lowered position. The furnace door 132 is then closed, and the technique continues at STEP 164, where the interior of the furnace 100 is brought to a high vacuum, such as a $10^{-7}$ vacuum pressure, by operation of vacuum pump 134. The workpiece 118 is then raised into the upper hot zone chamber 136 formed by insulating cylinder 106 and susceptor 116 at STEP 166. At STEP 168, the workpiece 118 is flushed with argon, and the interior of the furnace 100 is subsequently brought again to a high vacuum. The workpiece then begins to be heated at STEP 170, with an inert gas (e.g., nitrogen) then being introduced at partial pressure at STEP 172. The workpiece 118 is heated to 200-600° C. with the flowing inert gas to expedite removal of off-gassing, and the technique then continues at STEP 174 with the furnace chamber again being returned to a high vacuum via vacuum pump 134 and heated to a desired processing temperature. A material for coating the workpiece is then introduced if desired at STEP 176

The workpiece is begun to cool inside the vacuum at STEP 178. According to an embodiment of the invention, the workpiece is cooled to a temperature below a cooling threshold, and the workpiece is lowered out of the heating zone 136 and into the cooling zone 138 after the threshold has been met using the vacuum sealed bellows system 146 at STEP 180. In this manner, the vacuum pressure created inside the furnace may be maintained when moving the workpiece to the cooling zone 138. A quenching gas such as helium, argon, nitrogen, or a process gas such as hydrogen, hydrocarbon gas, chemical vapor deposition formulations, or forming gas is then injected at STEP 182, with the gas being injected at atmospheric pressure according to one embodiment. In other embodiments, the gas may be injected at a vacuum pressure or at a partial vacuum pressure. In addition, the gas may be injected through cooling system 140 and chamber 104 while maintaining a defined pressure.

According to various embodiments, gas may be injected at STEP 182 at either or both of the high and low workpiece positions, as faster cooling times can be achieved at lower temperatures by dropping the workpiece out of the hot zone 136 into the cool section 138 of the vacuum chamber 104. Thus, the process of injecting gas at STEP 182 can incorporate a repositioning of the workpiece down into the cooling zone 138 outside of susceptor 116 by lowering hot zone tray 126. As set forth above, the lowering of the workpiece 118 down into the cooling zone 138 may be governed by a threshold time and/or temperature, and may be triggered by pressure or RGA or partial pressure, or rates of any of these. In one embodiment, the workpiece 118 is dropped into the cool section after the workpiece has cooled to approximately an appropriate temperature as dictated by either equipment or process constraints, as further cooling below this threshold temperature is achieved most efficiently by passing cooling gas across the heated workpiece 118 when it is located in the cooling zone 138. By selectively positioning the workpiece 118 in the hot zone 136 and the cooling zone 138, the cooling time of the workpiece can be reduced greatly and faster cycle times can be met.

It is recognized that temperature uniformity within the workpiece 118 is very important during the heating and cooling of the workpiece and that, during the cooling process, the workpiece can develop thermal stress. The stress is greatly increased as the temperature difference across the workpiece grows, with the stress in the material thereof potentially causing premature failure or changes in geometry due to warpage. In applying cooling gas to the workpiece 118, such as at STEP 182 of technique 160, a typical vacuum furnace has a single port for gas entry, such that the side of the workpiece placed next to the location that the gas enters the hot zone will cool very quickly compared to the side that is shielded from the gas. This thermal mismatch is a source of thermal stress.

Figure 6:
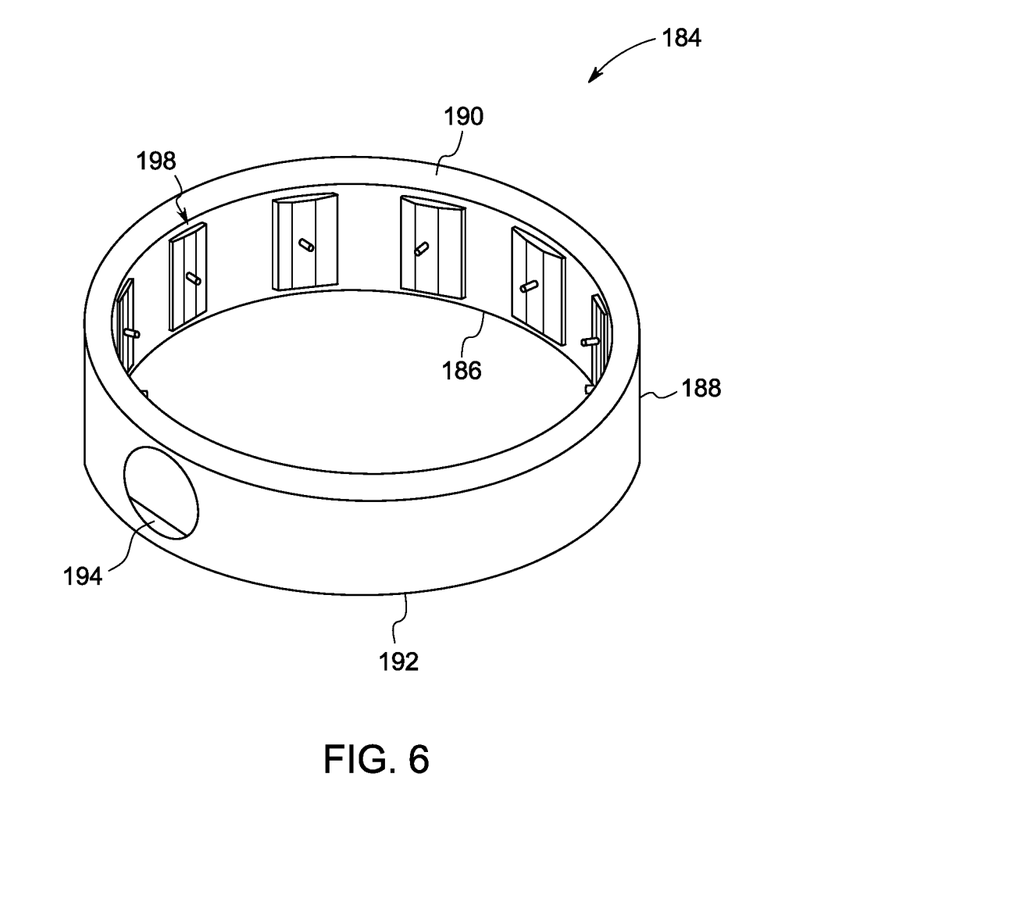
FIG. 6 is a perspective view of a cooling manifold for use with the induction furnace of FIGS. 3 and 4.

Therefore, according to one embodiment of the invention, a cooling manifold or ring 184 with multiple equally spaced ports on the gas feed side is implemented in cooling zone 138 to drive uniform gas cooling. As shown in FIGS. 3, 4 and 6, the cooling manifold 184 is a cylindrically shaped member that is positioned about the cooling zone 138. A hollow interior volume of the cooling manifold 184 is defined by inner and outer walls 186, 188 along with top and bottom walls 190, 192. An air inlet 194 is formed on one side of cooling manifold 184 to provide a supply of air into the interior volume thereof, with the air inlet 194 having a tubing or piping 196 connected thereto that provides cooling gas from an external source, such as the air blower 144. To maintain structural integrity and non-friability (i.e., durability), the cooling manifold 184 may be manufactured from a material that is vacuum and temperature compatible.

A plurality of gas ports 198 are formed in inner wall 186, with the gas ports being formed at a plurality of locations in the inner wall. According to an exemplary embodiment of the invention, the ports 198 are spaced around the entire circumference of the inner wall 186, with the spacing of the ports being uniform. The exact number of ports 198 and the angular spacing therebetween is system and workload specific, with the goal of maximizing cooling uniformity. According to various embodiments of the invention, the gas ports 198 may be static holes or be louvers, for example. In the embodiment of cooling manifold 184 illustrated in FIG. 6, the gas ports 198 are constructed as louvers that are independently operable and selectively controlled such that desired louvers can be opened and others left in a closed position. For example, louvers opposite the air inlet 194 and blower 144 may be closed to improve the cooling process. The desired air flow rate through gas ports 198 can also be controlled, with the flow rate desirably being as large as possible, up to any limits imposed by the system or workpiece (i.e., a fragile workpiece may demand reduced flow), such that the cooling time of the workpiece 118 can be minimized.

Thus, beneficially the inclusion of cooling manifold 184 in cooling zone 138 provides for improved workpiece part temperature uniformity during the cooling process, so as to decrease thermal stress in the part. The use of the multiport cooling manifold 184 provides greater part temperature uniformity at high gas flow rates, resulting in much faster furnace cooling rates, as compared to a low gas flow rate that is utilized to drive uniform part cooling and that significantly limits the maximum cooling rate achievable.

Figure 7:
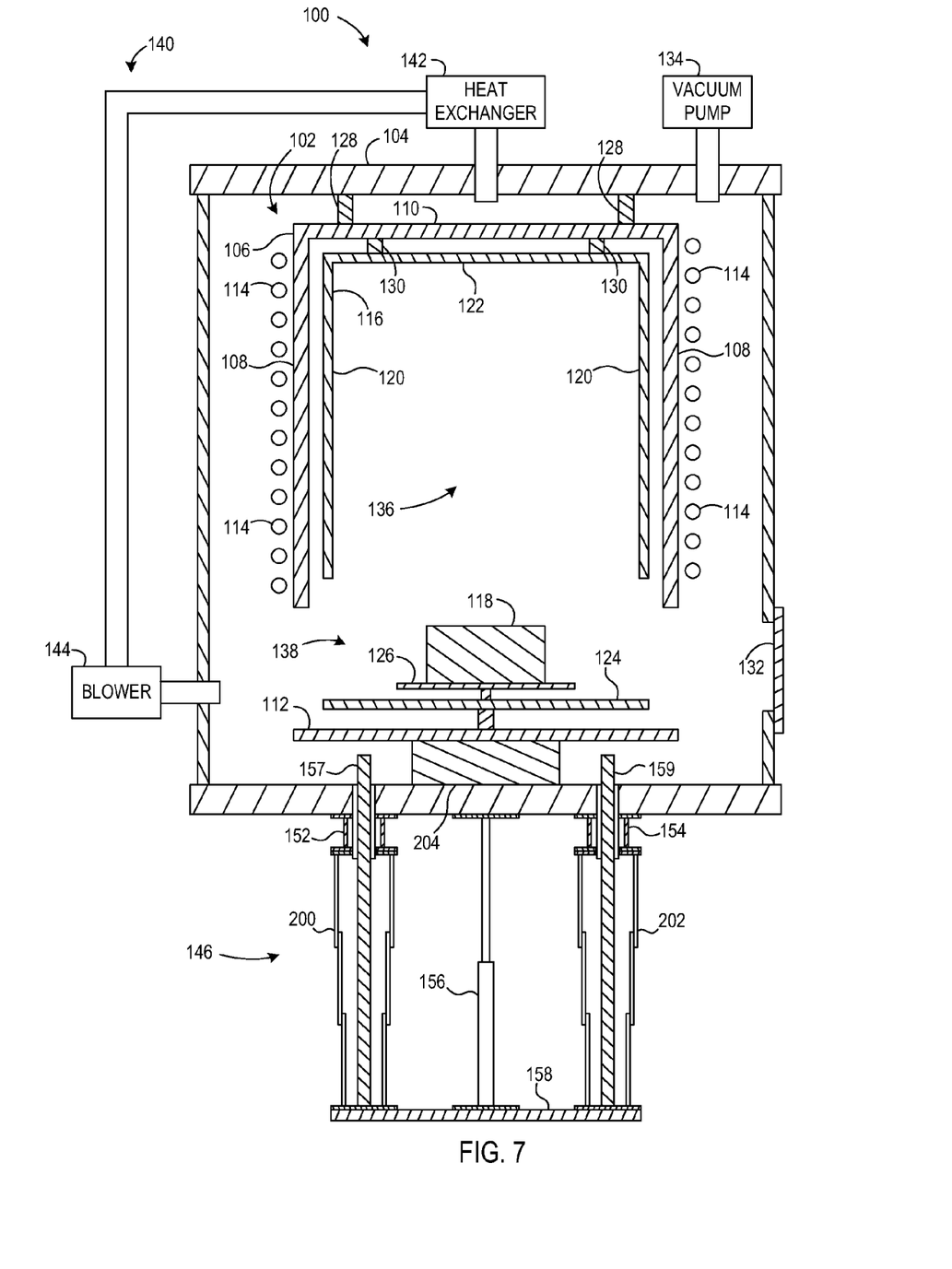
FIG. 7 is a diagram of the induction furnace of FIG. 4 according to another embodiment of the invention.

FIG. 7 illustrates a diagram of the induction furnace of FIG. 4 according to another embodiment of the invention. As illustrated, sealed translation system 146 includes a pair of vacuum-sealed telescoping enclosures 200, 202 attached to respective coupling devices 152, 154 that are coupled to chamber 104. Similar to that shown in FIG. 4, movement of linear actuator 156 from the outside of chamber 104 allows the atmosphere and pressure inside chamber 104 to be maintained when plate 158 is moved either away from or toward chamber 104. That is, while plate 158 is being moved away from or toward chamber 104, telescoping enclosures 200, 202 elongate or shorten accordingly to maintain a separation of the inside of chamber 104 from the volume or the outside environment. While bellows and telescoping enclosures are referred to in FIGS. 4 and 7, it is contemplated that other apparatus configured to sustain a vacuum during translation of plate 158 such as pistons and elastomers may also be used.

In addition, a convective mass or cold plate 204 may be used to cool workpiece 118 by convection through second cover 112, second cover 124, and tray 126. As supports 157, 159 lower second cover 112 toward cooling zone 138, second cover 112 comes in contact with and, in one embodiment, rests upon convective mass 204. In another embodiment, cold plate 204 may extend through second cover 112, second cover 124, and tray 126 to come into direct contact with workpiece 118.

Therefore, according to one embodiment of the invention, an induction furnace for heating a workpiece includes a chamber and an insulation cylinder positioned within the chamber, the insulation cylinder including a base cover that is selectively movable between a first position and a second position, wherein the first position is configured to position the workpiece within a heating zone of the induction furnace and wherein the second position is configured to position the workpiece within a cooling zone of the induction furnace. The induction furnace also includes a translation system having a first member coupled to the base cover of the insulation cylinder and extending through a wall of the chamber, an actuator coupled to the first member, the actuator configured to translate the first member to move the base cover of the insulation cylinder between the first and second positions, and an expansion member encircling a portion of the first member and configured to hermetically seal an interior volume of the chamber from an environment volume external to the chamber.

According to another embodiment of the invention, an induction furnace for cooling a workpiece includes a chamber having a susceptor positioned therein, wherein an interior volume of the susceptor defines a heating zone located within the chamber configured to be inductively heated by an induction coil when a current is provided to the induction coil and wherein the chamber has a cooling zone positioned therein outside of the interior volume of the susceptor. The induction furnace also includes a support system coupled to a base of the susceptor and that extends through the wall of the chamber, an actuator coupled to the support system and configured to selectively translate the support system to move the base of the susceptor to translate a workpiece tray supported by the base of the susceptor between the heating zone and the cooling zone, and an expansion system configured to surround a portion of the support system to hermetically seal the heating and cooling zones from an environment volume external to the chamber.

According to yet another embodiment of the invention, a method of making an induction furnace includes coupling an insulation cylinder within a chamber, the insulation cylinder including a base cover that is selectively movable between a first position and a second position, wherein the second position is configured to seal an interior volume of the insulation cylinder. The method also includes coupling an induction coil to surround at least a portion of the insulation cylinder, coupling a susceptor within the insulation cylinder, coupling a first member to the base cover of the insulation cylinder; the first member extending through a wall of the chamber, coupling a bellows system to surround a portion of the first member that includes an interior volume fluidly coupled to an interior volume of the chamber, coupling a actuator to the first member and to the bellows system, and configuring the actuator to selectively translate the first member to move the base cover of the insulation cylinder between the first and second positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An induction furnace for heating a workpiece, the induction furnace comprising:
   a chamber;
   an insulation cylinder positioned within the chamber, the insulation cylinder including a base cover that is selectively movable between a first position and a second position, wherein the first position is configured to position the workpiece within a heating zone of the induction furnace and wherein the second position is configured to position the workpiece within a cooling zone of the induction furnace;
   a cylindrically shaped cooling manifold positioned in the cooling zone, the cylindrically shaped cooling manifold constructed to surround the base cover when the base cover is in the second position within an inner wall of the cylindrically shaped cooling manifold;
   a heat exchanger configured to draw hot air from the chamber;
   a blower configured to blow cooled air that has passed through the heat exchanger into the cooling zone via the cooling manifold; and
   a translation system comprising:
     a first member coupled to the base cover of the insulation cylinder and extending through a wall of the chamber;
     an actuator coupled to the first member, the actuator configured to translate the first member to move the base cover of the insulation cylinder between the first and second positions; and an expansion member encircling a portion of the first member and configured to hermetically seal an interior volume of the chamber from an environment volume external to the chamber.

2. The induction furnace of claim 1 wherein the expansion member comprises a first bellows encircling the first member and configured to:

elongate when the first member moves the base cover of the insulation cylinder toward the open position; and shorten when the first member moves the base cover of insulation cylinder toward the closed position.

3. The induction furnace of claim 2 further comprising a coupling device configured to couple the first bellows to the wall of the chamber, wherein the first member is configured to extend through an interior volume of the coupling device.

4. The induction furnace of claim 1 further comprising a vacuum pump configured to create a vacuum within the chamber.

5. The induction furnace of claim 4 wherein the expansion member is configured to maintain a vacuum pressure in the chamber during movement of the base cover of the insulation cylinder from the closed position toward the open position.

6. The induction furnace of claim 1 wherein the actuator is coupled to the wall of the chamber external to an interior volume of the chamber.

7. The induction furnace of claim 6 further comprising a plate configured to couple the actuator to one of the expansion member and the first member.

8. The induction furnace of claim 1 wherein the actuator comprises one of a pneumatic piston, a hydraulic piston, an electro-mechanical piston, and a manual actuator.

9. The induction furnace of claim 1 further comprising a conduction member configured to conductively transfer heat away from the workpiece when the workpiece is positioned within the cooling zone.

10. The induction furnace of claim 1 wherein the cylindrically shaped cooling manifold comprises:

a plurality of walls configured to define a hollow interior volume of the the cylindrically shaped cooling manifold, the plurality of walls including the inner wall an outer wall and top and bottom walls;

an air port formed in the outer wall of the cylindrically shaped cooling manifold, the air port being connectable to the blower; and a plurality of gas ports formed in the inner wall of the cylindrically shaped cooling manifold so as to be spaced apart around a perimeter of the inner wall of the cylindrically shaped cooling manifold;

wherein cooled air received from the blower is passed through the hollow interior volume of the cylindrically shaped cooling manifold and exits the plurality of gas ports so as to provide a distributed and uniform airflow across a workpiece supported by the base cover.

11. The induction furnace of claim 1 further comprising:

an induction coil positioned to surround at least a portion of the insulation cylinder; and a susceptor positioned within the insulation cylinder, the susceptor being inductively heated by the induction coil when a current is provided to the induction coil.

12. An induction furnace for cooling a workpiece, the induction furnace comprising:

a chamber having a susceptor positioned therein, wherein an interior volume of the susceptor defines a heating zone located within the chamber configured to be inductively heated by an induction coil when a current is provided to the induction coil and wherein the chamber has a cooling zone positioned therein outside of the interior volume of the susceptor;

a support system coupled to a base of the susceptor, the support system extending through the wall of the chamber;

an actuator coupled to the support system and configured to selectively translate the support system to move the base of the susceptor to translate a workpiece tray supported by the base of the susceptor between a first position in the heating zone and a second position in the cooling zone;

a cylindrically shaped cooling manifold positioned in the cooling zone, the cylindrically shaped cooling manifold constructed to surround the workpiece tray when the workpiece tray is in the second position within an inner wall of the cylindrically shaped cooling manifold;

a heat exchanger configured to draw hot air from the chamber;

a blower configured to blow cooled air that has passed through the heat exchanger into the cooling zone via the cylindrically shaped cooling manifold; and an expansion system configured to surround a portion of the support system to hermetically seal the heating and cooling zones from an environment volume external to the chamber.

13. The induction furnace of claim 12 wherein the actuator and the expansion system are positioned within the environment volume.

14. The induction furnace of claim 13 wherein the actuator is coupled to the support system via a plate.

15. The induction furnace of claim 14 wherein the actuator is configured to translate the support system via translation of the plate.

16. The induction furnace of claim 12 wherein the support system comprises a first support and a second support; and wherein the expansion system comprises a first bellows and a second bellows configured to respectively surround a portion of the first support and a portion of the second support.

17. A method of making an induction furnace comprising:

coupling an insulation cylinder within a chamber;

providing the insulation cylinder with a heating chamber and a cooling chamber, the insulation cylinder including a base cover that is selectively movable between a first position in the heating chamber and a second position in the cooling chamber, wherein the second position is configured to seal an interior volume of the insulation cylinder;

coupling a cylindrically shaped cooling manifold in the cooling zone, the cylindrically shaped cooling manifold constructed to surround the base cover when the base cover is positioned in the second position within an inner wall of the cylindrically shaped cooling manifold;

providing a heat exchanger configured to draw hot air from the chamber;

providing a blower configured to blow cooled air that has passed through the heat exchanger into the cooling zone via the cylindrically shaped cooling manifold;

coupling an induction coil to surround at least a portion of the insulation cylinder;

coupling a susceptor within the insulation cylinder;

coupling a first member to the base cover of the insulation cylinder; the first member extending through a wall of the chamber;

coupling a bellows system to surround a portion of the first member, the bellows system having an interior volume fluidly coupled to an interior volume of the chamber;

coupling a actuator to the first member and to the bellows system; and configuring the actuator to selectively translate the first member to move the base cover of the insulation cylinder between the first and second positions.

18. The method of claim 17 wherein the bellows system is configured to maintain a hermetic seal in the chamber from an ambient environment during movement of the base cover between the first and second positions.

\* \* \* \* \*